(12) United States Patent
Varada et al.

(10) Patent No.: US 12,430,431 B2
(45) Date of Patent: Sep. 30, 2025

(54) SECURE MATERIAL MOVEMENT TO PREVENT MALWARE PROPAGATION

(71) Applicant: INTERNATIONAL BUSINESS MACHINES CORPORATION, Armonk, NY (US)

(72) Inventors: Sri Harsha Varada, Vizianagaram (IN); Venkata Vara Prasad Karri, Visakhapatnam (IN); Sarbajit K. Rakshit, Kolkata (IN); Sri Srikanth Magapu, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 17/451,525

(22) Filed: Oct. 20, 2021

(65) Prior Publication Data
US 2023/0124200 A1    Apr. 20, 2023

(51) Int. Cl.
*G06F 21/00* (2013.01)
*G06F 21/55* (2013.01)
*G06F 21/56* (2013.01)

(52) U.S. Cl.
CPC .......... *G06F 21/566* (2013.01); *G06F 21/554* (2013.01); *G06F 21/564* (2013.01); *G06F 21/568* (2013.01)

(58) Field of Classification Search
CPC .... G06F 21/568; G06F 21/564; G06F 21/554; G06F 21/566
USPC ......................................................... 726/22
See application file for complete search history.

(56) References Cited

U.S. PATENT DOCUMENTS

| 10,277,625 | B1 | 4/2019 | Efstathopoulos |
| 2008/0003997 | A1 | 1/2008 | Parkkinen |
| 2016/0098561 | A1* | 4/2016 | Keller ................... G06F 21/566 726/24 |
| 2018/0167228 | A1* | 6/2018 | Elcock ................ H04L 12/2823 |
| 2019/0202065 | A1* | 7/2019 | Hayashi ................. A63H 11/00 |
| 2021/0287164 | A1* | 9/2021 | Keenan, Jr. ........... B66B 1/2408 |
| 2022/0138612 | A1* | 5/2022 | Vengertsev .......... G05D 1/0238 706/12 |

FOREIGN PATENT DOCUMENTS

| CN | 110830494 | * 11/2019 | ......... H04L 63/1441 |
| DE | 102017106316 B4 | 3/2021 | |

OTHER PUBLICATIONS

French et al., A Model of a Malware Infected Automated Guided Vehicle for Experimental Cyber-Physical Security, ResearchGate, Conference Paper, Sep. 2018, 9 pages.

(Continued)

*Primary Examiner* — Josnel Jeudy
(74) *Attorney, Agent, or Firm* — Anthony M. Pallone

(57) ABSTRACT

According to one embodiment, a method, computer system, and computer program product for preventing malware propagation. The embodiment may include identifying a malware scan report of an Internet-of-Things (IoT) device within an automated material handling (AMH) environment. The embodiment may include determining whether the IoT device is malware affected. In response to determining that the IoT device is malware affected, the embodiment may include disabling the IoT device. The embodiment may include instructing an industrial robot to transport the IoT device to a destination location within the AMH environment.

11 Claims, 5 Drawing Sheets

(56) References Cited

OTHER PUBLICATIONS

Kohli, "Sound as virus!!! Can a computer virus communicate Via ultrasound signals?," Ciso Platform, Apr. 1, 2014, https://www.cisoplatform.com/profiles/blogs/sound-as-virus-can-a-computer-virus-communicate-via-ultrasound, 5 pages.
Mell et al., "The NIST Definition of Cloud Computing", National Institute of Standards and Technology, Special Publication 800-145, Sep. 2011, 7 pages.
Ng, "Billions of Bluetooth devices could get hit by this attack," CNET, Sep. 12, 2017, https://www.cnet.com/tech/services-and-software/bluetooth-devices-vulnerable-to-hack-blueborne-armis-labs/, 4 pages.
Souppaya et al., "Guide to Malware Incident Prevention and Handling for Desktops and Laptops," NIST Special Publication 800-83, Revision 1, http://dx.doi.org/10.6028/NIST.SP.800-83r1, Jul. 2013, 47 pages.
Yaacoub et al., "Robotics cyber security: vulnerabilities, attacks, countermeasures, and recommendations," International Journal of Information Security, https://doi.org/10.1007/s10207-021-00545-8, Mar. 19, 2021, pp. 44 pages.

* cited by examiner

SECURE MATERIAL MOVEMENT TO PREVENT MALWARE PROPAGATION

BACKGROUND

The present invention relates generally to the field of computing, and more particularly to automated material handling.

Material handling (MH) involves short-distance movement of materials within the confines of a building or between a building and a transportation vehicle. MH uses a wide range of manual, semi-automated, and automated equipment. The use of automated equipment for MH may include the use of computer-controlled machines (e.g., mobile scanning devices, Internet-of-Things devices, conveyers), automated guided vehicles, and robotics such as autonomous mobile robots and industrial robots. MH further includes consideration of the protection, storage, and control of materials throughout their manufacturing, warehousing, distribution, consumption, and disposal. The materials may include raw materials as well as computing parts, computing objects, and microprocessor-controlled devices (e.g., Internet-of-Things (IoT) devices) capable of sending and receiving data.

SUMMARY

According to one embodiment, a method, computer system, and computer program product for preventing malware propagation. The embodiment may include identifying a malware scan report of an Internet-of-Things (IoT) device within an automated material handling (AMH) environment. The embodiment may include determining whether the IoT device is malware affected. In response to determining that the IoT device is malware affected, the embodiment may include disabling the IoT device. The embodiment may include instructing an industrial robot to transport the IoT device to a destination location within the AMH environment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
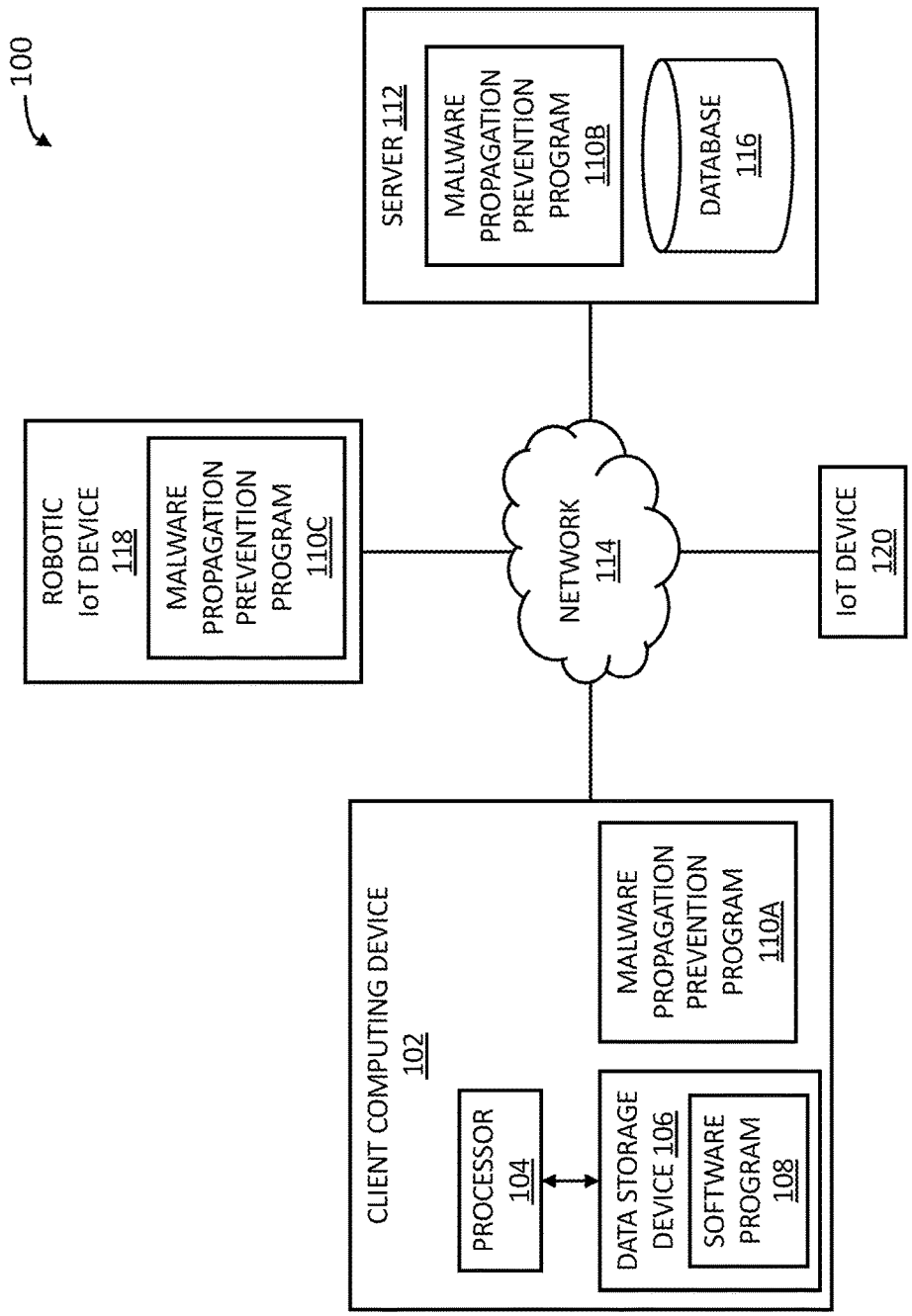
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to automated material handling. The following described exemplary embodiments provide a system, method, and program product to, among other things, determine if malware is present within a computing or IoT device which is to be handled by a robot or other microprocessor-controlled machine in an automated MH environment and, accordingly, partially or completely disable the computing or IoT device before it is handled. Therefore, the present embodiment has the capacity to improve the technical field of automated material handling by preventing the propagation of detected malware to robotic and other microprocessor-controlled machines as they handle malware affected computing or IoT devices, thus improving security of robotic and other microprocessor-controlled machines in an automated MH environment.

As previously described, MH involves short-distance movement of materials within the confines of a building or between a building and a transportation vehicle. MH uses a wide range of manual, semi-automated, and automated equipment. The use of automated equipment for MH may include the use of computer-controlled machines (e.g., mobile scanning devices, IoT devices, conveyers), automated guided vehicles, and robotics such as autonomous mobile robots and industrial robots. MH further includes consideration of the protection, storage, and control of materials throughout their manufacturing, warehousing, distribution, consumption, and disposal. The materials may include raw materials as well as computing parts, computing objects, and microprocessor-controlled devices (e.g., IoT devices) capable of sending and receiving data.

In the context of an automated industrial warehouse or manufacturing environment where industrial robots or other microprocessor-controlled machines are handling materials which include computing and IoT devices capable of wirelessly transmitting data, malware propagation from malware affected computing and IoT devices to components of the automated MH environment (i.e., the industrial robots or other microprocessor-controlled machines) may present an undesirable software security risk. Such malware propagation may be possible, for instance, via a Bluetooth connection or via ultrasound signal transmission. For example, a Bluetooth enabled industrial robot or other microprocessor-controlled machine may unknowingly become malware affected as a result of handling or coming into proximity of a malware affected computing or IoT device which is also Bluetooth enabled. A similar outcome may result if the malware affected computing or IoT device transmits an ultrasound signal containing malware which is received via a microphone of an industrial robot or other microprocessor-controlled machine. It may therefore be imperative to have a system in place to prevent the propagation of malware within an automated MH environment by disabling, partially or completely, a malware affected computing or IoT device before it is handled by an industrial robot or other microprocessor-controlled machine of the automated MH environment, and/or by sufficiently distancing the malware affected computing or IoT device from other devices and components of the automated MH environment while it is being handled. Thus, embodiments of the present invention may be advantageous to, among other things, evaluating a malware scan report of a computing or IoT device that is to be handled within an automated MH environment, disabling wireless communication and/or sound producing capabilities of a malware affected computing or IoT device before it is handled, distancing a malware affected computing or IoT device such that it is not within a range to allow for wireless malware propagation, and enhancing software security within an automated MH environment. The present invention does not require that all advantages need to be incorporated into every embodiment of the invention.

According to at least one embodiment, before an IoT device is handled by an industrial robot within an automated material handling (AMH) environment, the proposed system may evaluate a malware scan report of the IoT device to determine if the IoT device is malware affected. Upon determining that the IoT device is malware affected, the proposed system may partially or completely disable the malware affected IoT device. The malware affected IoT device may then be handled (e.g., gripped) by the industrial robot and transported to a destination location. According to at least one other embodiment, if disablement of the malware affected IoT device is either unsuccessful or unverifiable, the industrial robot may transport the malware affected IoT device to the destination location via a mobility path, identified by the proposed system, which is distanced (e.g., out of Bluetooth communication range) from other IoT devices and industrial robots within the AMH environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to evaluate a malware scan report of an IoT device in order to determine if the IoT device is malware affected before it is handled by an industrial robot or other microprocessor-controlled machine within an AMH environment and, accordingly, partially or completely disable the IoT device if it is determined to be malware affected so that propagation of the malware from the IoT device to the industrial robot or other microprocessor-controlled machine is prevented.

Referring to FIG. 1, an exemplary networked computer environment 100 is depicted, according to at least one embodiment. The networked computer environment 100 may include a client computing device 102, a server 112, a robotic IoT device 118, and an IoT device 120 interconnected via a communication network 114. According to at least one implementation, the networked computer environment 100 may include a plurality of client computing devices 102, robotic IoT devices 118, IoT devices 120, and servers 112, of which only one of each is shown for illustrative brevity. Additionally, in one or more embodiments, the client computing device 102, the server 112, and the robotic IoT device 118 may each host a malware propagation prevention program 110A, 110B, 110C. In one or more other embodiments, the malware propagation prevention program 110A, 110B, 110C may be partially hosted on client computing device 102, server 112, and on robotic IoT device 118 so that functionality may be separated among the devices.

The communication network 114 may include various types of communication networks, such as a wide area network (WAN), local area network (LAN), a telecommunication network, a wireless network (e.g., Wi-Fi, Bluetooth), a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a malware propagation prevention program 110A and communicate with the server 112, robotic IoT device 118, and IoT device 120 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a malware propagation prevention program 110B and a database 116 and communicating with the client computing device 102, robotic IoT device 118, and IoT device 120 via the communication network 114, in accordance with embodiments of the invention. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Robotic IoT device 118 may be an IoT-enabled industrial robot or other IoT-enabled microprocessor-controlled machine (e.g., a computer-controlled metal cutting machine, a robot for handling objects in an AMH environment) with a microphone, a camera, a barcode scanner, and various other sensors, embedded in or external to the robot/machine, that is capable of hosting and running a malware propagation prevention program 110C, connecting to the communication network 114, and transmitting and receiving data with the client computing device 102, IoT device 120, and the server 112. The microphone of robotic IoT device 118 may include any known microphone in the art for capturing audio output (e.g., ultrasound signals). The camera of robotic IoT device 118 may include any known camera in the art for capturing images. According to at least one implementation, the networked computer environment 100 may include a plurality of robotic IoT devices 118. As will be discussed with reference to FIG. 4, the robotic IoT device 118 may include internal components 402c and external components 404c, respectively.

IoT device 120 may be any IoT enabled device or microprocessor-controlled computing device/component known in the art that is capable of connecting to the communication network 114 and transmitting and receiving data with the client computing device 102, the robotic IoT device 118, and the server 112. For example, IoT device 120 may be, but is not limited to, a smartphone, a tablet, a laptop, a smart thermostat, a smart speaker, a wearable computing device, and an IoT-enabled component of a computing device or a machine. According to at least one implementation, the networked computer environment 100 may include a plurality of microphone IoT devices 122.

According to the present embodiment, the malware propagation prevention program 110A, 110B, 110C may be a program capable of identifying a source and destination location of an IoT device/component which is to be handled/transported by an industrial robot in an AMH environment, performing and evaluating a malware scan of an IoT device/component and of any industrial robot that has been in contact with the IoT device/component, identifying if an IoT device/component or an industrial robot is malware affected, partially or completely disabling a malware affected IoT device/component before it is handled/transported, identifying a distanced mobility path for a malware affected IoT device/component, and performing contact tracing for a malware affected IoT device/component or a malware affected industrial robot. The malware propagation prevention method is explained in further detail below with respect to FIG. 2.

Figure 2:
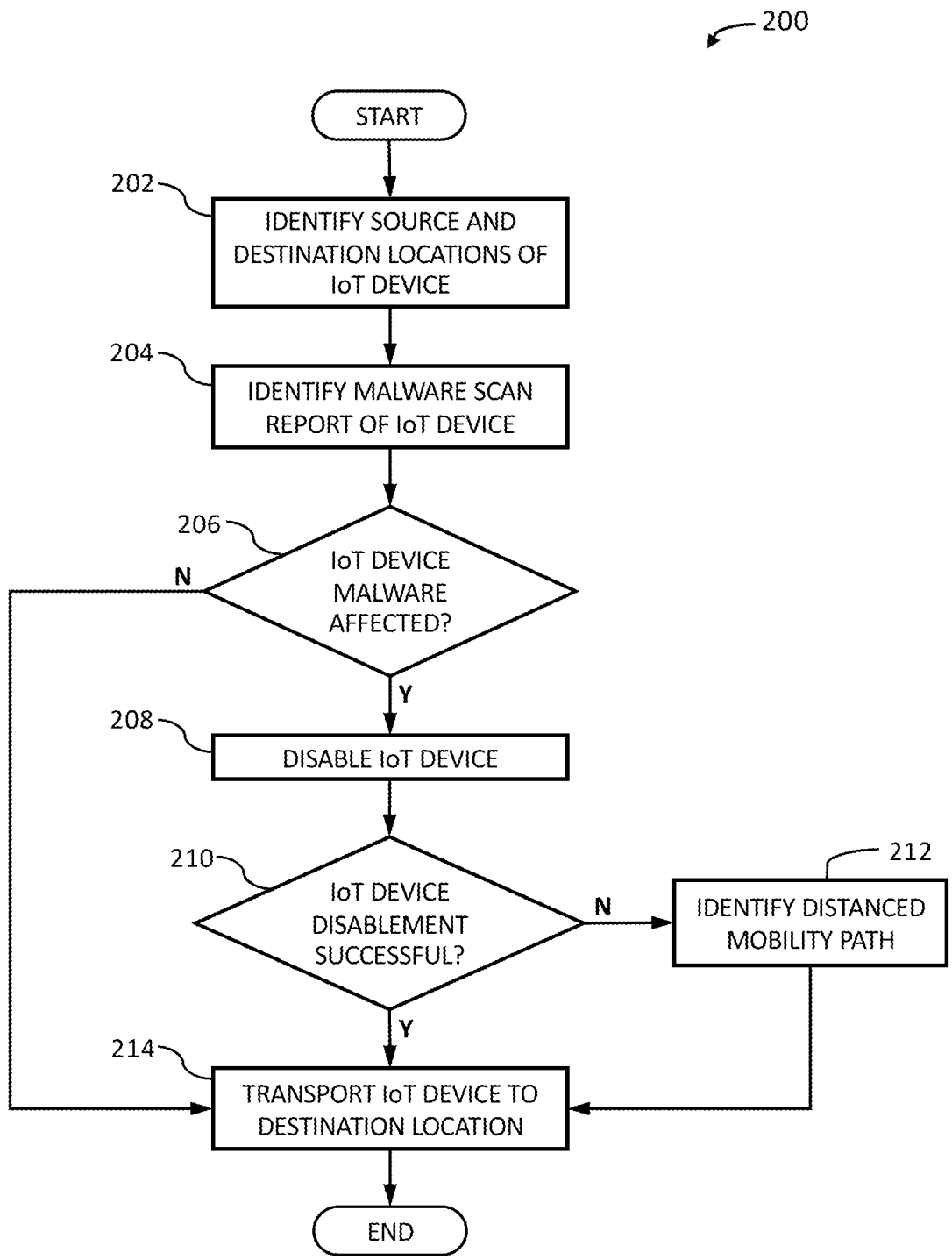
FIG. 2 illustrates an operational flowchart for preventing the propagation of malware within a robotic material handling environment in a malware propagation prevention process according to at least one embodiment.

Referring now to FIG. 2, an operational flowchart for preventing malware propagation in a malware propagation prevention process 200 is depicted according to at least one embodiment. At 202, the malware propagation prevention (MPP) program 110A, 110B, 110C identifies an IoT device/component (e.g., IoT device 120) that is to be handled (e.g., manipulated or transported), according to handling need, by an industrial robot (e.g., robotic IoT device 118) within an AMH environment. MPP program 110A, 110B, 110C may also identify attributes, such as source and destination locations, for the IoT device/component. Additionally, at 202, the MPP program 110A, 110B, 110C may identify further attributes of the IoT device/component including a unique identifier, a role/description, handling need/instruction, and existing wireless communication capabilities (e.g., Bluetooth module, ultrasound signal module) or lack thereof. According to at least one embodiment, the MPP program 110A, 110B, 110C may identify or receive the aforementioned attributes via a scan of a barcode or quick response (QR) code of the IoT device/component or via a Bluetooth signal exchange between the industrial robot and the IoT device/component. The MPP program 110A, 110B, 110C may instruct the industrial robot to perform the barcode or QR code scan via a barcode scanner or camera of the industrial robot and receive information of the scan from the industrial robot.

According to at least one other embodiment, the MPP program 110A, 110B, 110C may identify or receive attribute information for every IoT device/component present within the AMH environment during an inventory process. Furthermore, as part of the inventory process, the MPP program 110A, 110B, 110C may perform a malware scan (e.g., a wireless malware scan) of every IoT device/component and every industrial robot present within the AMH environment using known antivirus software solutions. MPP program 110A, 110B, 110C may store malware scan results for IoT devices/components and industrial robots within data storage device 106 or database 116. Also, during the inventory process, the MPP program 110A, 110B, 110C may identify or receive attribute information, including a unique identifier, a role/description, and existing wireless communication capabilities, of every industrial robot present within the AMH environment. The industrial robots may also have respective barcodes or QR codes which may provide the attribute information. All computing devices (i.e., client computing devices, servers, industrial robots, and IoT devices/components) present within the AMH may be able to communicate with each other wirelessly.

At 204, the MPP program 110A, 110B, 110C identifies a malware scan report for the IoT device/component identified at step 202 before it is handled by the industrial robot. According to at least one embodiment, MPP program 110A, 110B, 110C may access the malware scan report for the IoT device/component from data storage device 106 or database 116. According to at least one other embodiment, MPP program 110A, 110B, 110C may perform a malware scan of the IoT device/component and generate a corresponding scan report which may be stored within data storage device 106 or database 116. MPP program 110A, 110B, 110C may perform the malware scan of the IoT device/component via a computer (e.g., client computing device 102, server 112) or an industrial robot (e.g., robotic IoT device 118) of the AMH environment.

Next, at 206, the MPP program 110A, 110B, 110C determines whether the IoT device/component is malware affected or not. In making this determination, the MPP program 110A, 110B, 110C evaluates the identified malware scan report of the IoT device/component to identify if malware has been detected within the IoT device/component (e.g., a malware flag is present within the scan report). In response to determining the IoT device/component is malware affected (step 206, "Y" branch), the malware propagation prevention process 200 may proceed to step 208. In response to determining the IoT device/component is not malware affected (step 206, "N" branch), the MPP program 110A, 110B, 110C may allow the IoT device/component to remain enabled (i.e., powered-on and able to wirelessly communicate with other IoT devices/components and industrial robots within the AMH environment) while it is handled by the industrial robot and the malware propagation prevention process 200 may proceed to step 212.

At 208, the MPP program 110A, 110B, 110C disables identified wireless communication capabilities (e.g., Bluetooth communication, ultrasound signal transmission) of the IoT device/component. Existing wireless communication capabilities of the IoT device/component may be identified at step 202 or during the inventory process described above.

At 210, the MPP program 110A, 110B, 110C determines if the disablement of the wireless communication capabilities was successful. In response to determining the disablement of the wireless communication capabilities was successful (step 210, "Y" branch), the MPP program 110A, 110B, 110C may allow the IoT device/component to remain powered-on while it is handled by the industrial robot and the malware propagation prevention process 200 may proceed to step 214. In response to determining the disablement of the wireless communication capabilities was not successful (step 210, "N" branch), the malware propagation prevention process 200 may proceed to step 212.

According to at least one other embodiment, if wireless communication capabilities of the IoT device/component cannot be identified or if it is determined that the disablement of the identified wireless communication capabilities of the IoT device/component was not successful or is not verified, the MPP program 110A, 110B, 110C may completely power-off the IoT device/component. Additionally, the MPP program 110A, 110B, 110C may disable the wireless communication capabilities (e.g., Bluetooth module, ultrasound microphone) of the industrial robot before handling the IoT device/component.

At 212, the MPP program 110A, 110B, 110C identifies a distanced mobility path for the malware-affected IoT device/component as it is handled by the industrial robot to its destination location. The distanced mobility path may be a route traversed by the industrial robot to the destination location of the IoT device/component which maintains a sufficient distance from other IoT devices/components and industrial robots within the AMH environment. A sufficient distance may be a distance which is greater than a wireless transmission range (e.g., Bluetooth or ultrasound signal transmission range) of the IoT device/component. Furthermore, according to at least one embodiment, the MPP program 110A, 110B, 110C may perform a contact tracing for a malware-affected IoT device/component or a malware-affected industrial robot as it is handled or moves about within the AMH environment. The contact tracing may include information such as the unique identifier of the malware-affected IoT device/component or industrial robot and the unique identifiers of any other IoT devices/components or industrial robots within the AMH environment which have come into physical contact or within wireless transmission range of the malware-affected IoT device/component or industrial robot. Contact tracing information may be stored within data storage device 106 or database 116.

At 214, the MPP program 110A, 110B, 110C instructs the industrial robot to handle the IoT device/component and move it to its destination location. According to at least one embodiment in which the IoT device/component is malware free, the destination location of the IoT device/component may be a storage location. In such an embodiment, the MPP program 110A, 110B, 110C may ensure that the IoT device/component does not become malware affected by either disabling the wireless communication capability of the IoT device/component or powering-off the IoT device/component.

According to at least one other embodiment in which the IoT device/component is malware affected, the MPP program 110A, 110B, 110C may instruct the industrial robot to handle the IoT device/component and move it to its destination location via the identified distanced mobility path. Moreover, the MPP program 110A, 110B, 110C may identify, as the destination location for the malware-affected IoT device/component, a distanced storage location that is out of wireless transmission range of other IoT devices/components or industrial robots within the AMH environment. The MPP program 110A, 110B, 110C may change a previous destination location of the IoT device/component to the distanced storage location if the IoT device/component is determined to be malware affected.

According to another embodiment, the destination location of the IoT device/component may be a second industrial robot for further handling of the IoT device/component according to its handling need/instruction (e.g., assembly activity). In such an embodiment, before the second industrial robot receives the IoT device/component the first industrial robot (i.e., the industrial robot currently handling the IoT device/component), the MPP program 110A, 110B, 110C may instruct the second industrial robot to access the malware scan of the IoT device/component from data storage device 106 or database 116 or instruct the second industrial robot to perform another malware scan of the IoT device/component and generate another scan report. The MPP program 110A, 110B, 110C may then evaluate the accessed or generated scan report to determine if the IoT device/component is malware affected and proceed as described above. A malware scan of the IoT device/component may be performed every time the IoT device/component is transferred between industrial robots within the AMH environment.

Furthermore, in such an embodiment, before the first industrial robot transfers the IoT device/component to the second industrial robot, the MPP program 110A, 110B, 110C may instruct the first industrial robot to access the malware scan of the second industrial robot from data storage device 106 or database 116 or instruct the first industrial robot to perform a malware scan of second industrial robot and generate a scan report. The MPP program 110A, 110B, 110C may then evaluate the accessed or generated scan report to determine if the second industrial robot is malware affected. In the event the second industrial robot is malware affected, the MPP program 110A, 110B, 110C may disable the second industrial robot and instruct the first industrial robot to attempt transfer of the IoT device/component to another industrial robot with a same role as the second industrial robot. In the event the second industrial robot is not malware affected, the MPP program 110A, 110B, 110C may instruct the first industrial robot to transfer the IoT device/component to the second industrial robot for further handling. Likewise, before the second industrial robot receives the IoT device/component from the first industrial robot, the MPP program 110A, 110B, 110C may instruct the second industrial robot to access the malware scan of the first industrial robot from data storage device 106 or database 116 or instruct the second industrial robot to perform a malware scan of first industrial robot and generate a scan report. The MPP program 110A, 110B, 110C may then evaluate the accessed or generated scan report to determine if the first industrial robot is malware affected. In the event the first industrial robot is malware affected, the MPP program 110A, 110B, 110C may disable the wireless communication capability of the first industrial robot and instruct the second industrial robot to not accept the IoT device/component. Additionally, the MPP program 110A, 110B, 110C may instruct the first industrial robot to move the IoT device/component to a distanced storage location. In the event the first industrial robot is not malware affected, the MPP program 110A, 110B, 110C may instruct the second industrial robot to receive the IoT device/component for further handling.

It may be appreciated that FIG. 2 provides only an illustration of one implementation and do not imply any limitations with regard to how different embodiments may be implemented. Many modifications to the depicted environments may be made based on design and implementation requirements.

Figure 3:
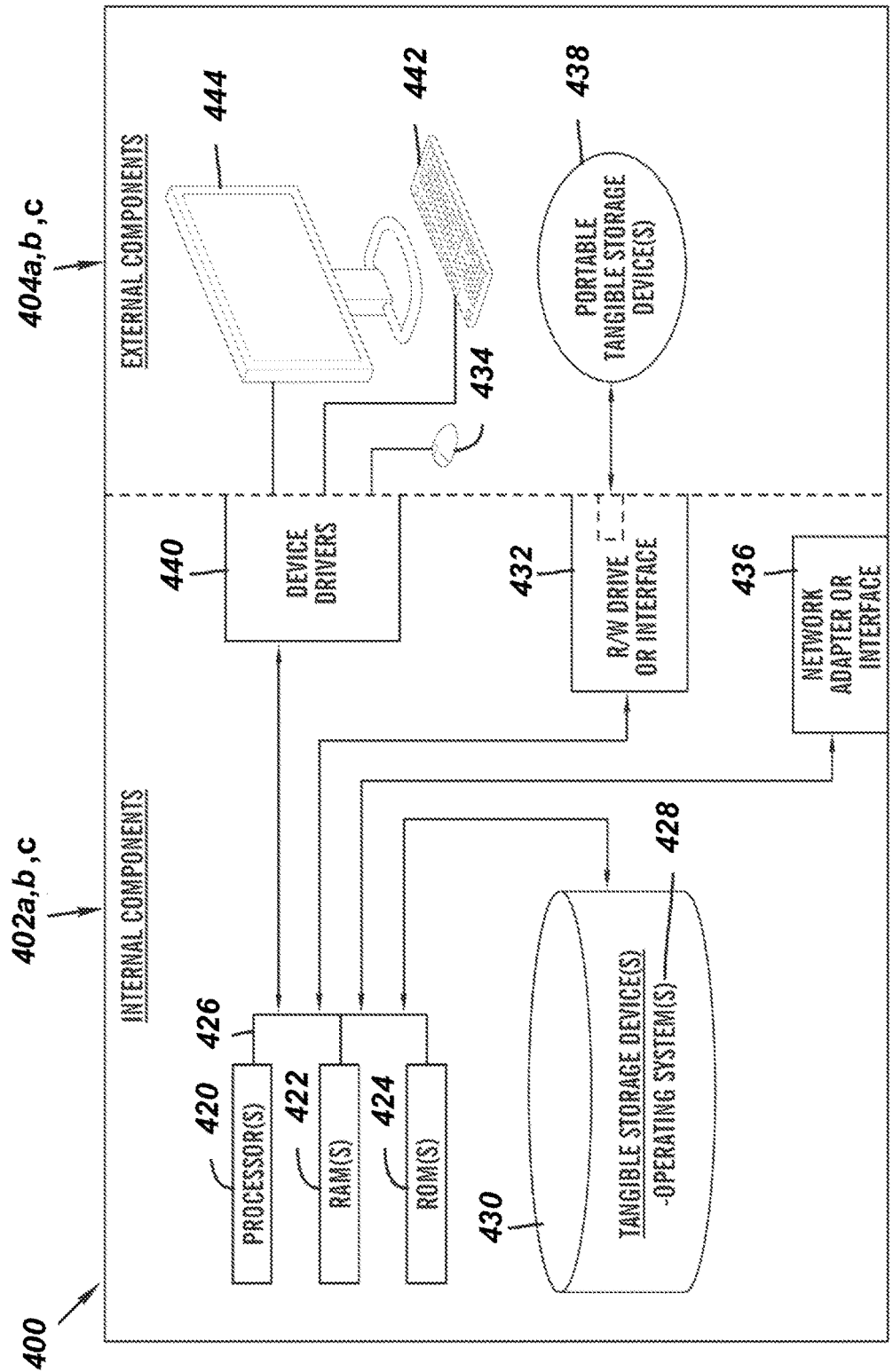
FIG. 3 is a functional block diagram of internal and external components of computers and servers depicted in FIG. 1 according to at least one embodiment.

FIG. 3 is a block diagram 400 of internal and external components of the client computing device 102, the server 112, and the robotic IoT device 118 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, industrial robots, and distributed cloud computing environments that include any of the above systems or devices.

The client computing device 102, the server 112, and the robotic IoT device 118 may include respective sets of internal components 402 a,b,c and external components 404 a,b,c illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the MPP program 110A in the client computing device 102, the MPP program 110B in the server 112, and the MPP program 110C in the robotic IoT device 118 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b,c also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the MPP program 110A, 110B, 110C can be stored on one or more of the respective portable computer-readable tangible storage devices 438, read via the respective R/W drive or interface 432, and loaded into the respective hard drive 430.

Each set of internal components 402 a,b,c also includes network adapters or interfaces 436 such as a TCP/IP adapter cards, wireless Wi-Fi interface cards, or 3G or 4G wireless interface cards or other wired or wireless communication links. The software program 108 and the MPP program 110A in the client computing device 102, the MPP program 110B in the server 112, and the MPP program 110C in the robotic IoT device 118 can be downloaded to the client computing device 102, the server 112, and the robotic IoT device 118 from an external computer via a network (for example, the Internet, a local area network or other, wide area network) and respective network adapters or interfaces 436. From the network adapters or interfaces 436, the software program 108 and the MPP program 110A in the client computing device 102, the MPP program 110B in the server 112, and the MPP program 110C in the robotic IoT device 118 are loaded into the respective hard drive 430. The network may comprise copper wires, optical fibers, wireless transmission, routers, firewalls, switches, gateway computers and/or edge servers.

Each of the sets of external components 404 a,b,c can include a computer display monitor 444, a keyboard 442, and a computer mouse 434. External components 404 a,b,c can also include touch screens, virtual keyboards, touch pads, pointing devices, and other human interface devices. Each of the sets of internal components 402 a,b,c also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
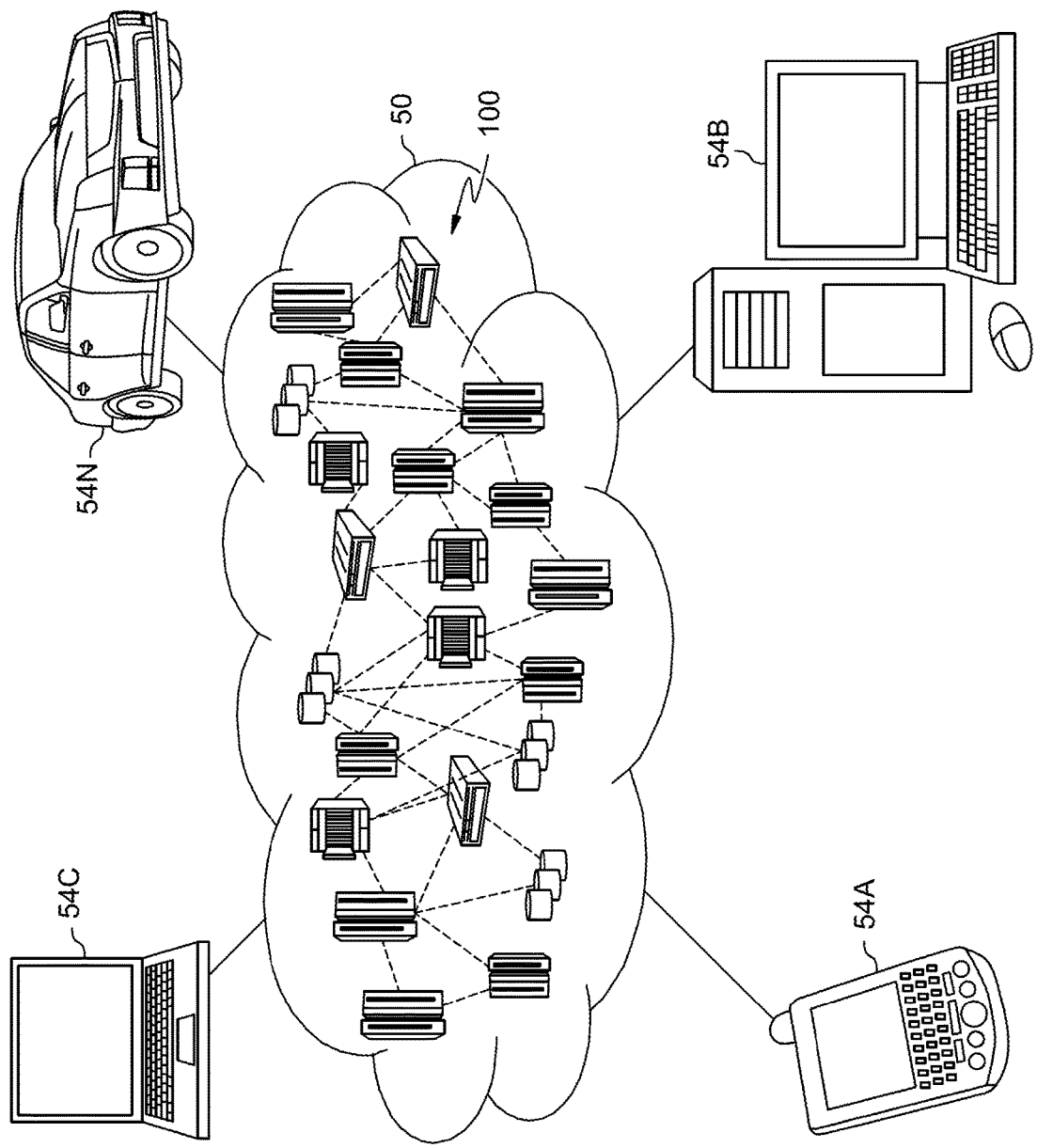
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
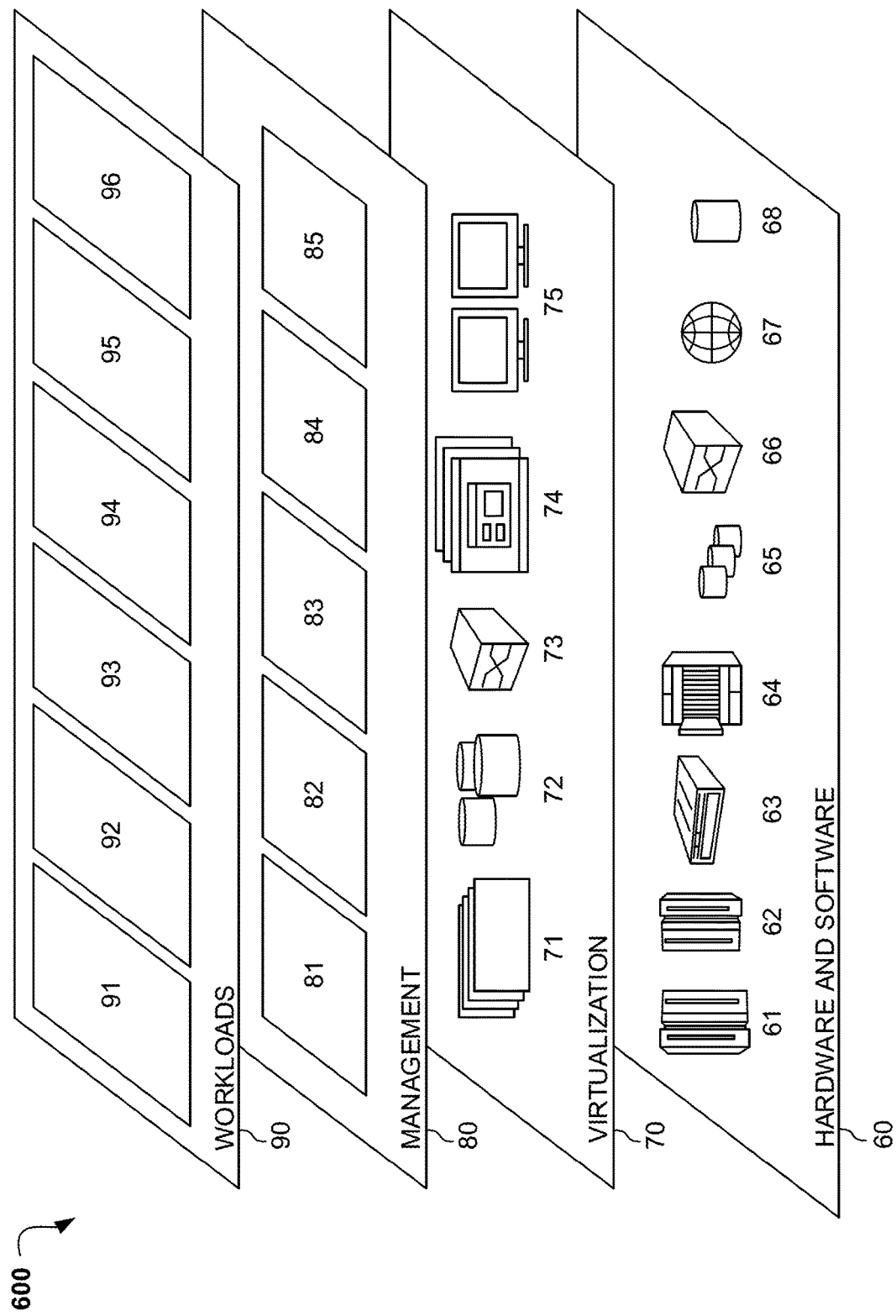
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and malware propagation prevention 96. Malware propagation prevention 96 may relate to preventing the wireless propagation of malware from a malware-affected device to other devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of preventing malware propagation, the method comprising:
    identifying a malware scan report of an Internet-of-Things (IoT) device within an automated material handling (AMH) environment;
    determining whether the IoT device is malware affected;
    in response to determining that the IoT device is malware affected, disabling the IoT device and performing a contact tracing for the IoT device, where the contact tracing comprises information including unique identifiers of other IoT devices or industrial robots within the AMH environment which have come into physical contact or within wireless transmission range of the IoT device;

determining whether disablement of the IoT device was successful;

in response to determining that disablement of the IoT device was successful, instructing an industrial robot to transport the IoT device to a destination location within the AMH environment;

in response to determining that disablement of the IoT device was not successful, identifying a distanced mobility path, wherein the distanced mobility path comprises a traversal path which maintains a distance from other IoT devices and industrial robots within the AMH environment that is greater than a wireless transmission range of the IoT device; and instructing the industrial robot to transport the IoT device to a distanced storage location via the identified distanced mobility path, wherein the distanced storage location comprises a location which is out of wireless transmission range of other IoT devices or industrial robots within the AMH environment.

2. The method of claim 1, wherein disabling the IoT device comprises disabling wireless communication capability of the IoT device or powering-off the IoT device.

3. The method of claim 1, wherein identifying the malware scan report of the IoT device comprises accessing a malware scan report from a stored location or performing a malware scan of the IoT device and generating a malware scan report for the IoT device.

4. The method of claim 1, further comprising:
instructing a first industrial robot to transfer the IoT device to a second industrial robot within the AMH environment;

identifying a malware scan report of the IoT device and determining whether the IoT device is malware affected;

identifying a malware scan report of the first industrial robot and determining whether the first industrial robot is malware affected;

identifying a malware scan report of the second industrial robot and determining whether the second industrial robot is malware affected;

in response to determining that the second industrial robot is malware affected, instructing the first industrial robot to not transfer the IoT device to the second industrial robot; and in response to determining that the first industrial robot or the IoT device is malware affected, instructing the second industrial robot to not accept transfer of the IoT device from the first industrial robot.

5. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

identifying a malware scan report of an Internet-of-Things (IoT) device within an automated material handling (AMH) environment;

determining whether the IoT device is malware affected;

in response to determining that the IoT device is malware affected, disabling the IoT device and performing a contact tracing for the IoT device, where the contact tracing comprises information including unique identifiers of other IoT devices or industrial robots within the AMH environment which have come into physical contact or within wireless transmission range of the IoT device;

determining whether disablement of the IoT device was successful;

in response to determining that disablement of the IoT device was successful, instructing an industrial robot to transport the IoT device to a destination location within the AMH environment;

in response to determining that disablement of the IoT device was not successful, identifying a distanced mobility path, wherein the distanced mobility path comprises a traversal path which maintains a distance from other IoT devices and industrial robots within the AMH environment that is greater than a wireless transmission range of the IoT device; and instructing the industrial robot to transport the IoT device to a distanced storage location via the identified distanced mobility path, wherein the distanced storage location comprises a location which is out of wireless transmission range of other IoT devices or industrial robots within the AMH environment.

6. The computer system of claim 5, wherein disabling the IoT device comprises disabling wireless communication capability of the IoT device or powering-off the IoT device.

7. The computer system of claim 5, wherein identifying the malware scan report of the IoT device comprises accessing a malware scan report from a stored location or performing a malware scan of the IoT device and generating a malware scan report for the IoT device.

8. The computer system of claim 5, further comprising:
instructing a first industrial robot to transfer the IoT device to a second industrial robot within the AMH environment;

identifying a malware scan report of the IoT device and determining whether the IoT device is malware affected;

identifying a malware scan report of the first industrial robot and determining whether the first industrial robot is malware affected;

identifying a malware scan report of the second industrial robot and determining whether the second industrial robot is malware affected;

in response to determining that the second industrial robot is malware affected, instructing the first industrial robot to not transfer the IoT device to the second industrial robot; and in response to determining that the first industrial robot or the IoT device is malware affected, instructing the second industrial robot to not accept transfer of the IoT device from the first industrial robot.

9. A computer program product, the computer program product comprising:
one or more computer readable storage medium and program instructions stored on at least one of the one or more computer readable storage medium, the program instructions executable by a processor capable of performing a method, the method comprising:

identifying a malware scan report of an Internet-of-Things (IoT) device within an automated material handling (AMH) environment;

determining whether the IoT device is malware affected;

in response to determining that the IoT device is malware affected, disabling the IoT device and performing a contact tracing for the IoT device, where the contact tracing comprises information including unique identifiers of other IoT devices or industrial robots within the AMH environment which have come into physical contact or within wireless transmission range of the IoT device;

determining whether disablement of the IoT device was successful;

in response to determining that disablement of the IoT device was successful, instructing an industrial robot to transport the IoT device to a destination location within the AMH environment;

in response to determining that disablement of the IoT device was not successful, identifying a distanced mobility path, wherein the distanced mobility path comprises a traversal path which maintains a distance from other IoT devices and industrial robots within the AMH environment that is greater than a wireless transmission range of the IoT device; and instructing the industrial robot to transport the IoT device to a distanced storage location via the identified distanced mobility path, wherein the distanced storage location comprises a location which is out of wireless transmission range of other IoT devices or industrial robots within the AMH environment.

10. The computer program product of claim 9, wherein disabling the IoT device comprises disabling wireless communication capability of the IoT device or powering-off the IoT device.

11. The computer program product of claim 9, wherein identifying the malware scan report of the IoT device comprises accessing a malware scan report from a stored location or performing a malware scan of the IoT device and generating a malware scan report for the IoT device.

\* \* \* \* \*